United States Patent Office 3,109,709
Patented Nov. 5, 1963

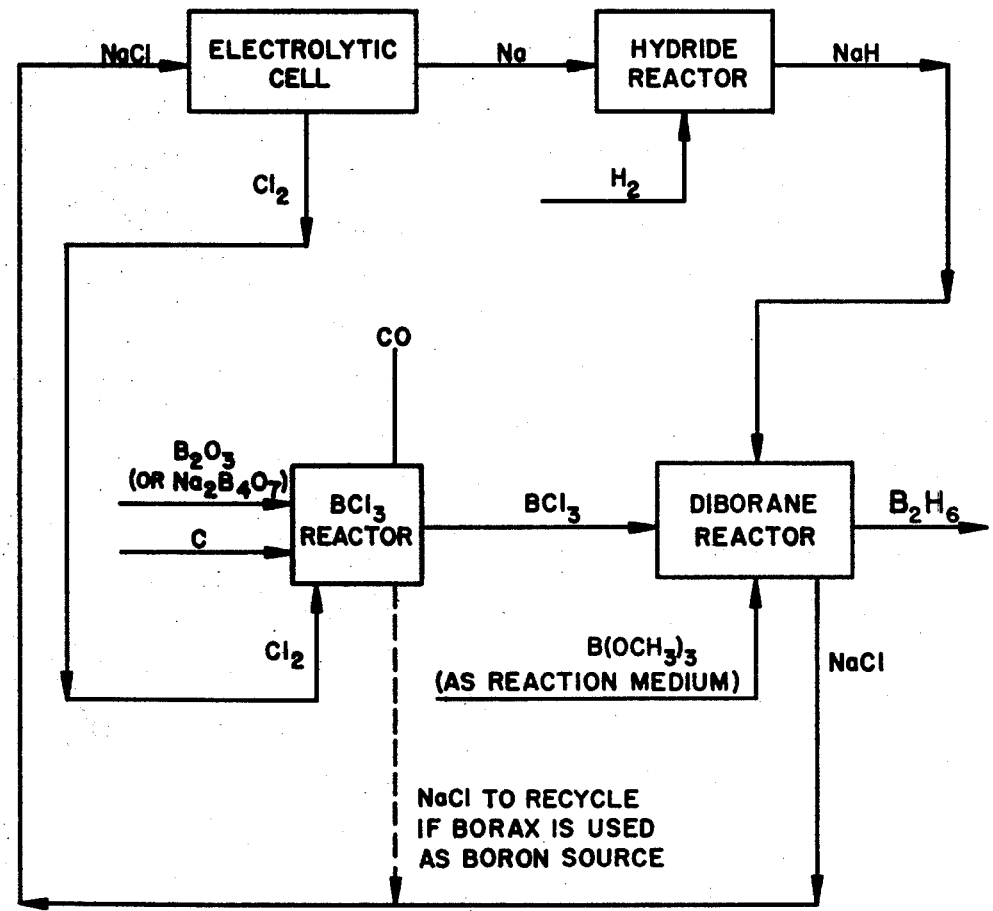
CYCLIC PROCESS FOR
PREPARATION OF DIBORANE

3,109,709
CYCLIC PROCESS FOR PREPARATION
OF DIBORANE
William H. Schechter, Zelienople, Pa., assignor, by mesne
assignments, to Callery Chemical Company, Pittsburgh,
Pa., a corporation of Pennsylvania
Filed Apr. 8, 1955, Ser. No. 500,053
7 Claims. (Cl. 23—204)

This invention relates to a new and useful cyclic process for the preparation of diborane.

The boron hydrides or boranes in general, and diborane in particular, have been thoroughly investigated in recent years as possible sources for high energy fuels. As a result of considerable investigation, several methods have been developed for the preparation of diborane. These methods have been only moderately successful and do not lend themselves to adaption to a completely cyclic process which permits full recycle and utilization of reaction by-products. The earliest work on the preparation of boranes, and particularly the preparation of diborane, was done by Alfred Stock and his co-workers prior to 1930. Stock's method of preparing diborane utilized the hydrolysis of metal borides such as magnesium boride with a strong aqueous solution of a mineral acid such as hydrochloric acid. This reaction yielded a mixture of several different boranes including small quantities of diborane but was never considered an efficient preparative process. Sometime later Drs. Schlesinger and Burg were able to obtain diborane in slightly greater yields by reacting a boron halide and hydrogen in an electric arc at very low pressures. This method was more effective than the methods used by Stock but still produced only small quantities of diborane and in rather poor yields. More recently other methods have been developed which have been more successful both in the yield of diborane and the purity of the product obtained. These methods have generally used metal hydrides and various boron containing compounds as starting materials. Some of these processes have converted a metal hydride such as lithium hydride or sodium hydride to the corresponding metal borohydride and reacted said borohydride with a Lewis acid to generate diborane. This type of process however is more expensive and difficult to carry out because of the fact that it requires the preparation of the metal borohydride as a starting reagent.

The most desirable process and one which would lend itself readily to a completely cyclic operation is one which starts with a metal hydride such as lithium hydride or sodium hydride and a boron halide such as boron trifluoride or boron trichloride. The reaction of metal hydrides and boron halides in general is reported in United States Patent 2,544,472 to Schlesinger and Brown. This patent however describes only the reaction of sodium or lithium hydrides with boron trifluoride and surmises that the other boron halides will function equally well. The reaction of alkali metal hydrides and boron trifluoride as described by Schlesinger and Brown is one which requires about 24 to 48 hours to complete even when carried out in liquid suspension and utilizing a considerable amount of agitation. When an alkali metal hydride such as lithium or sodium borohydride is reacted with boron trifluoride, diborane is produced but the by-product of the reaction is LiF or NaBF$_4$ depending upon the starting hydride used. When LiF is the by-product of reaction it is very difficult to recover the fluorine and lithium values for regeneration of lithium hydride and boron trifluoride as would be required in a complete cyclic process. When NaBF$_4$ is the by-product of reaction the same problems are present as to the recovery of sodium and fluorine values and there is the additional problem in that a mol of BF$_3$ is lost with every mol of by-product NaBF$_4$ which is formed. If sodium hydride and boron trichloride could be reacted as follows:

$$6NaH + 2BCl_3 \rightarrow 6NaCl + B_2H_6$$

in good yield it would be very simple to establish a fully cyclic process for the preparation of diborane since sodium chloride would be the only by-product of reaction and the sodium and chlorine values are readily recoverable therefrom by electrolysis. If that reaction could be carried out readily it would be possible to establish a fully cyclic process for the preparation of diborane according to the following reactions:

(1) $\quad 6NaH + 2BCl_3 \longrightarrow 6NaCl + B_2H_6$ (2) $\quad 6NaCl \xrightarrow{\text{electrolysis}} 6Na + 3Cl_2$ (3) $\quad 6Na + 3H_2 \longrightarrow 6NaH$ (4) $\quad B_2O_3 + 3C + 3Cl_2 \longrightarrow 2BCl_3 + 3CO$ (or $Na_2B_4O_7 + 7C + 7Cl_2 \longrightarrow 2NaCl + 7CO + 4BCl_3$)

The overall material balance for such a cyclic process would thus be:

(5) $\quad B_2O_3 + 3C + 3H_2 \longrightarrow B_2H_6 + 3CO$

If Na$_2$B$_4$O$_7$ is used as the boron source for BCl$_3$ the NaCl formed in that reaction is recycled for electrolysis to produce the additional Cl$_2$ required in the process. In attempting to carry out this cyclic process steps or reactions numbered 2, 3 and 4 (including alternate Reaction No. 4) have been successfully carried out and the desired products produced in substantially quantitative yields. The principal obstacle to the carrying out of this cyclic process has been the fact that NaH and BCl$_3$ can be reacted only with great difficulty and then in very poor yield. When NaH and BCl$_3$ are reacted in the dry state with agitation or utilizing abrasive apparatus such as a ball mill or the like only a very poor yield of diborane is obtained. When NaH and BCl$_3$ were reacted in suspension in any of a great variety of solvents the yield of diborane was still very, very low. It was found that BCl$_3$ and NaH would react giving moderate yields of diborane when the reaction was carried out in a dimethyl ether of a polyethylene glycol, such as diethylene glycol dimethyl ether or tetraethylene glycol dimethyl ether. While this reaction produces a much better yield of diborane it has been found, however, that the boron trichloride either when added as a gas or as an etherate attacks the solvent and cleaves it into components which no longer have the desired solvent characteristics. It is thus seen that the lack of an operative process for carrying out the reaction of NaH and BCl$_3$ is the principal obstacle to the development of a commercially operative cyclic process for the preparation of diborane.

It is therefore an object of this invention to provide a new and useful process for the preparation of diborane which is fully cyclic and provides for substantially complete recovery of all by-products formed.

Another object of this invention is to provide a cyclic process for the preparation of diborane in which borax or boric oxide, carbon, and hydrogen are reacted to produce diborane, utilizing sodium chloride, sodium hydride, and boron trichloride as reaction intermediates.

Another object of this invention is to provide a new and useful process for preparing diborane by the reaction of sodium hydride and boron trichloride, utilizing dimethoxychloroborane and dimethoxyborane as reaction intermediates.

Another object of this invention is to provide a new and improved process for the preparation of dimethoxyborane by the reaction of sodium hydride, sodium trimethoxyborohydride, or sodium borohydride with boron trichloride or dimethoxychloroborane utilizing suitable solvents as the reaction medium.

Another object is to provide a new and improved method of preparing dimethoxyborane in which no boron containing by-product is formed.

Another object is to provide a new and improved process for preparing dimethoxyborane in which sodium chloride is the only reaction by-product.

Other objects will become apparent from time to time throughout the specification and claims as hereinafter related.

This new and improved cyclic process for producing diborane and for producing dimethoxyborane will be more fully described hereinafter and the novelty thereof will be particularly pointed out and distinctly claimed.

In the accompanying drawing there is shown a flow diagram illustrating this cyclic process for the preparation of diborane.

This invention is based upon the discovery that sodium hydride, sodium trimethoxyborohydride, or sodium borohydride will react with boron trichloride or dimethoxychloroborane in the presence of a solvent such as a polyethylene glycol dialkyl ether to form dimethoxyborane and sodium chloride according to the following chemical equations:

$$BCl_3 + 2B(OCH_3)_3 \rightleftarrows 3(CH_3O)_2BCl$$
$$3NaH + BCl_3 + 2B(OCH_3)_3 \rightarrow 3HB(OCH_3)_2 + 3NaCl$$
$$NaH + (CH_3O)_2BCl \rightarrow HB(OCH_3)_2NaCl$$
$$NaBH_4 + (CH_3O)_2BCl \rightarrow HB(OCH_3)_2 + NaCl + \tfrac{1}{2}B_2H_6$$
$$3NaBH(OCH_3)_3 + BCl_3$$
$$\rightarrow 3HB(OCH_3)_2 + 3NaCl + B(OCH_3)_3$$
$$NaBH(OCH_3)_3 + (CH_3O)_2BCl$$
$$\rightarrow HB(OCH_3)_2 + NaCl + B(OCH_3)_3$$

The trimethyl borate formed in the last two equations can be recycled so that it will react with more boron trichloride to form dimethoxychloroborane as shown in the first equation. Thus, no boron is lost in a useless by-product. The dimethoxyborane which is formed is allowed to disproportionate (or may be subjected to heat and pressure to increase the rate of disproportionation) to produce diborane according to the reaction:

$$6HB(OCH_3)_2 \rightarrow B_2H_6 + 4B(OCH_3)_3$$

The trimethyl borate which is released upon disproportionation of the dimethoxyborane is recycled for further reaction with boron trichloride to form dimethoxychloroborane. The trimethyl borate which is used in this series of reactions therefore functions only as a carrier for the reaction of sodium hydride and boron trichloride to produce diborane. None of the trimethyl borate is consumed in the reaction. In all of these reactions for the preparation of dimethoxyborane, the dimethoxychloroborane may be added to the reaction mixture either directly or may be formed in situ by adding stoichiometric proportions of $BCl_3$ and $B(OCH_3)_3$. When dimethoxychloroborane is used in these reactions no cleavage of the solvents has been observed as is the case when $BCl_3$ is the sole reactant added. By carrying out the reaction of sodium hydride and boron trichloride as above described to produce diborane and sodium chloride, through the use of dimethoxychloroborane and dimethoxyborane as intermediates, it is possible to prepare diborane through a process which is fully cyclic in operation and which has heretofore been impossible to carry out. In this process the following reactions are utilized:

(1) $6NaH + 2BCl_3 \longrightarrow 6NaCl + B_2H_6$ (a) $6NaH + 2BCl_3 + 4B(OCH_3)_3 \longrightarrow$

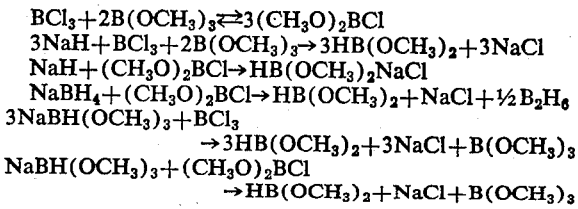

(2) $6NaCl \xrightarrow{\text{electrolysis}} 6Na + 3Cl_2$ (3) $6Na + 3H_2 \longrightarrow 6NaH$ (4) $B_2O_3 + 3C + 3Cl_2 \longrightarrow 2BCl_3 + 3CO$ (a) or as an alternative

$Na_2B_4O_7 + 7C + 7Cl_2 \longrightarrow$ $2NaCl + 7CO + 4BCl_3$

The overall material balance for this cyclic process is therefore:

$$B_2O_3 + 3C + 3H_2 \rightarrow B_2H_6 + 3CO$$

If $Na_2B_4O_7$ is used as the boron source for preparation for $BCl_3$ the additional NaCl is recycled for electrolysis to produce the additional $Cl_2$ required. In carrying out this cyclic process the electrolysis of the by-product NaCl is conventional and can be found fully described in numerous chemical engineering tests. The reaction of sodium and hydrogen to produce sodium hydride is also conventional and is described in such references as "Chemistry of the Hydrides," by D. T. Hurd, and in United States Patents 1,796,265 and 1,958,012. The preparation of $BCl_3$ by reaction of boric oxide or borax with carbon and chlorine is carried out using a slight excess of carbon at a temperature in the range of 400 to 1000° C. This process is described in Patent 2,097,482 to Weber and Buyer. While the processes for electrolysis of sodium chloride, formation of sodium hydride, and preparation of boron trichloride are described in the prior art it has been heretofore impossible to integrate these three steps into a completely cyclic process for the preparation of diborane because of the lack of a satisfactory method for carrying out the reaction of sodium hydride and boron trichloride to produce diborane. This problem has been solved in this invention and thus provides not only the final process step as an operative process in and of itself but also provides for the first time a completely cyclic process for the preparation of diborane from the aforementioned raw materials.

In establishing the operability of this process several experiments were carried out in a 500 milliliter round-bottomed flask equipped with a reflux condenser. In one series, a mixture of sodium hydride with varying amounts of trimethyl borate in diethylene glycol dimethyl ether, $CH_3O(C_2H_4O)_2CH_3$, was heated at 70°–90° C. for 15 minutes to preform sodium trimethoxyborohydride. Dimethoxychloroborane was then introduced into the flask and allowed to react with the sodium trimethoxyborohydride. The dimethoxyborane formed immediately and was removed by distillation and collected in cold traps. The hydrogen evolved was measured with a wet test meter.

The following results were obtained:

| Run No. | mls. M2M [1] | mmols NaH | mmols (CH$_3$O)$_2$BCl | mls. B(OCH$_3$)$_3$ | Percent Yield HB(OCH$_3$)$_2$ |
|---|---|---|---|---|---|
| 1 | 66 | 125 | 125 | 99 | 64 |
| 2 | 66 | 125 | 125 | 99 | 67 |
| 3 | 66 | 125 | 125 | 33 | 73 |

[1] M2M means diethylene glycol dimethyl ether.

In these experiments about 10% of the active (hydridic) hydrogen was lost as molecular hydrogen due to impurities in the solvent and the reactants. This loss of active (or hydridic) hydrogen is not an inherent defect in this reaction and is completely eliminated when the impurities in the solvent and the reactants are removed. These impurities are due principally to the presence of small quantities of water or other hydroxyl containing substances. The term active hydrogen as used herein refers to hydridic hydrogen or hydrogen which is releasable upon hydrolysis. It should be specially noted that sodium hydride and boron trichloride react only with difficulty but that good yields of dimethoxyborane are obtained when trimethyl borate is added to the system in an amount sufficient to convert the sodium hydride to sodium trimethoxyborohydride and the boron trichloride to dimethoxychloroborane.

In another series of experiments, sodium trimethoxyborohydride was used in place of sodium hydride and allowed to react with dimethoxychloroborane. With diethylene glycol dimethyl ether as the solvent, all the reactants were mixed at room temperature in a reaction flask and the reaction mixture heated to distill off the dimethoxyborane which formed immediately.

| Run No. | mls. M2M[1] | mmols NaHB(OCH$_3$)$_3$ | mmols (CH$_3$O)$_2$BCl | mls. B(OCH$_3$)$_3$ | Percent Yield HB(OCH$_3$)$_2$ |
|---|---|---|---|---|---|
| 4 | 66 | 125 | 125 | 99 | 72 |
| 5 | 66 | 125 | 125 | 99 | 75 |
| 6 | 165 | 125 | 125 | 0 | 86 |

[1] M2M means diethylene glycol dimethyl ether.

These data show that the conversion of sodium trimethoxyborohydride to dimethoxyborane proceeds rapidly and substantially completely even when no additional trimethyl borate is used. In this reaction also approximately 10% of the active hydrogen was lost as molecular hydrogen due to impurities in the solvents and reactants. As was previously described the losses in active hydrogen may be completely eliminated by complete removal of water and hydroxyl containing impurities from the solvents and the reactants.

In a third series of experiments sodium hydride and trimethyl borate in tetrahydrofuran were heated at reflux for 15 minutes to preform sodium trimethoxyborohydride before introducing the dimethoxychloroborane. In the experiments with sodium trimethoxyborohydride, the dimethoxychloroborane was added without an initial heat treatment. In each case the reaction mixture was heated to distill the dimethoxyborane formed. The results of typical experiments are shown below:

| Run No. | mls. THF[1] | mmols Initial Reactant | mmols (CH$_3$O)$_2$BCl | mls. B(OCH$_3$)$_3$ | Percent Yield HB(OCH$_3$)$_2$ |
|---|---|---|---|---|---|
| 7 | 165 | NaHB(OCH$_3$)$_3$, 125 | 125 | 0 | 34 |
| 8 | 66 | NaH, 125 | 125 | 99 | 37 |
| 9 | 132 | NaH, 125 | 125 | 33 | 42 |
| 10 | 1 | NaH, 125 | 125 | 165 | 48 |

[1] THF means tetrahydrofuran.

It is obvious from an inspection of the above results that much lower yields of dimethoxyborane are obtained when tetrahydrofuran is used as a solvent in this reaction. Furthermore, with tetrahydrofuran a much higher percentage of active hydrogen was lost as molecular hydrogen than when diethylene glycol dimethyl ether was used as a solvent. Variations in the quantity of tetrahydrofuran did not significantly alter the results obtained, except that hydroxyl impurities result in loss of active hydrogen. It should also be noted that no trimethyl borate is necessary when sodium trimethoxyborohydride is used. It was also found that sodium hydride and dimethoxychloroborane gave more satisfactory results in either tetrahydrofuran or diethylene glycol dimethyl ether when additional trimethyl borate was added.

In another experiment, 15 millimols of sodium borohydride and 15 millimols of dimethoxychloroborane were reacted in a reaction flask in 2 ml. of diethylene glycol dimethyl ether. The reaction was carried out at room temperature and the mixture was then distilled to remove the products formed. The condensable products formed were collected in cold traps and analyzed. About 27% of the active hydrogen was evolved as molecular hydrogen and the remainder was recovered as dimethoxyborane and diborane.

In other experiments using different solvents it was found that any solvent which would dissolve an appreciable quantity of trimethoxyborohydride was satisfactory. Such solvents include, dioxane, triethylene glycol dimethyl ether and tetraethylene glycol dimethyl ether.

Although several embodiments of this invention have been described, it should be understood that within the scope of the appended claims this invention may be practiced otherwise than as specifically described.

Having thus described this invention fully and completely as required by the patent statutes, what is desired to be claimed and secured by Letters Patent of the United States is:

1. A cyclic process for preparing diborane which comprises reacting sodium hydride and boron trichloride in the presence of a substantial amount of trimethyl borate and a solvent selected from the group consisting of polyethylene glycol dimethyl ethers, dioxane, and tetrahydrofuran to produce dimethoxyborane and by-product sodium chloride, disproportionating the dimethoxyborane to produce diborane, recovering the resultant diborane as product, electrolyzing said by-product sodium chloride to produce sodium and chlorine, reacting the sodium thus formed with hydrogen to produce sodium hydride, supplying the sodium hydride thus formed for reaction with boron trichloride, reacting the chlorine formed with carbon and a compound of the group consisting of B$_2$O$_3$ and B$_2$O$_3$ containing salts to produce boron trichloride, and supplying the boron trichloride formed for reaction with sodium hydride.

2. A cyclic process for the preparation of diborane which comprises reacting sodium hydride and dimethoxychloroborane in diethyleneglycoldimethylether to produce dimethoxyborane and by-product sodium chloride, disporportionating the dimethoxyborane to produce diborane and by-product methylborate, recovering said diborane as product, electrolyzing said by-product sodium chloride to produce sodium and chlorine, reacting the sodium thus formed with hydrogen to produce sodium hydride, supplying the sodium hydride thus produced for reaction in said first-mentioned reaction of sodium hydride and dimethoxychloroborane, reacting the chlorine thus formed with carbon and a compound of the group consisting of B$_2$O$_3$ and B$_2$O$_3$ containing salts to produce borontrichloride, reacting the borontrichloride thus formed with said by-product methylborate to form dimethoxychloroborane and supplying said dimethoxychloroborane for reaction with sodium hydride.

3. A cyclic process for the preparation of diborane which comprises reacting sodium trimethoxyborohydride with dimethoxychloroborane in a solvent for sodium trimethoxyborohydride selected from the group consisting of polyethylene glycol dimethyl ethers, dioxane, and tetrahydrofuran to produce dimethoxyborane and by-product sodium chloride, disproportionating the dimethoxyborane to produce diborane and by-product methyl borate, recovering said diborane as product, electrolyzing said by-product sodium chloride to produce sodium and chlorine, reacting the sodium thus formed with hydrogen to produce sodium hydride, supplying the sodium hydride for reaction with a portion of said by-product methyl borate to form sodium trimethoxyborohydride, reacting the chlorine thus formed with carbon and a compound of the group consisting of $B_2O_3$ and $B_2O_3$ containing salts to produce boron trichloride, reacting the boron trichloride with a second portion of said by-product methyl borate to form dimethoxychloroborane, and recycling said dimethoxychloroborane and said sodium trimethoxyborohydride to said first mentioned reaction for the production of dimethoxyborane.

4. A method of preparing dimethoxyborane, $$HB(OCH_3)_2$$

which comprises reacting a compound of the group consisting of sodium hydride and sodium trimethoxyborohydride with dimethoxychloroborane in a solvent selected from the group consisting of polyethylene glycol dimethyl ethers, dioxane and tetrahydrofuran and recovering the dimethoxyborane formed.

5. A method according to claim 4 in which the dimethoxychloroborane is formed in situ by the reaction of boron trichloride with trimethylborate.

6. A method according to claim 4 in which sodium trimethoxyborohydride is formed in situ by the reaction of sodium hydride with trimethyl borate.

7. A method for the production of diborane which comprises reacting sodium borohydride and dimethoxy boron chloride while the reactants are in admixture with a polyethylene glycol dialkyl ether of the formula $$RO-(CH_2-CH_2O)_n-R$$

wherein R is a lower alkyl radical and wherein $n$ is an integer from 2 to 4 and recovering diborane from the reaction mixture.

References Cited in the file of this patent
UNITED STATES PATENTS

| | | |
|---|---|---|
| 1,958,012 | Muckenfuss | May 8, 1934 |
| 2,369,214 | Cooper | Feb. 13, 1945 |
| 2,494,968 | Schlesinger et al. | Jan. 17, 1950 |
| 2,543,511 | Schlesinger | Feb. 27, 1951 |
| 2,544,472 | Schlesinger et al. | Mar. 6, 1951 |
| 2,968,531 | Adams et al. | Jan. 17, 1961 |
| 2,994,586 | Huff | Aug. 1, 1961 |
| 3,014,059 | Bush et al. | Dec. 19, 1961 |

OTHER REFERENCES

Schechter et al.: "Boron Hydrides and Related Compounds," January 8, 1951, Dept. Navy, Bureau of Aeronautics, declassified January 5, 1954, pages 20, 21, 44, 65.

Hurd: "Chemistry of the Hydrides," page 91, John Wiley & Sons (1952).

Brown et al.: "J. Am. Chem. Soc., vol. 75, pp. 192–195 (January 5, 1953).

Gmelin's Handbuch der Anorganischen Chemie, System No. 13, Boron, pp. 227, 248, 249 (1954).

Brown et al.: "Journal of the American Chemical Society," vol. 80, pages 1552–1558 (1958).

Schechter et al.: "Boron Hydrides and Related Compounds," prepared by Callery Chemical Co. for Dept. of Navy, Bureau of Aeronautics, printed January 8, 1951, declassified January 5, 1954, pages 10 and 11.